United States Patent
Szabo et al.

(10) Patent No.: US 6,508,269 B2
(45) Date of Patent: Jan. 21, 2003

(54) QUICK CONNECTOR WITH ONE-WAY CHECK VALVE

(75) Inventors: George Szabo, Ortonville; Shad A. Kelly, Madison Heights, both of MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/748,958

(22) Filed: Dec. 27, 2000

(65) Prior Publication Data

US 2002/0078998 A1 Jun. 27, 2002

(51) Int. Cl.⁷ .................... F16K 15/04; F16L 37/08
(52) U.S. Cl. ................ 137/515.5; 137/533.11; 285/921
(58) Field of Search .................. 137/515, 515.3, 137/515.5, 515.7, 528, 533.11; 285/423, 921; 251/284

(56) References Cited

U.S. PATENT DOCUMENTS

| | | | |
|---|---|---|---|
| 1,430,986 A | * 10/1922 | Hallman | 137/515.5 |
| 1,901,217 A | 3/1933 | Yerkes et al. | |
| 2,354,255 A | * 7/1944 | Gillum et al. | 137/515.5 |
| 4,071,945 A | 1/1978 | Brandt | |
| 4,155,374 A | * 5/1979 | Diehl | 137/519.5 |
| 4,423,892 A | 1/1984 | Bartholomew | 285/319 |
| 4,674,529 A | * 6/1987 | Ferguson | 137/375 |
| 5,277,402 A | 1/1994 | Szabo | 251/149.6 |
| 5,478,046 A | * 12/1995 | Szabo | 251/149.6 |
| 5,582,204 A | * 12/1996 | Hiranuma et al. | 137/515.5 |
| 5,595,213 A | * 1/1997 | Brown | 137/515.5 |
| 6,026,855 A | * 2/2000 | Jackson et al. | 137/512.15 |

* cited by examiner

Primary Examiner—Michael Powell Buiz
Assistant Examiner—Ramesh Krisnamurthy
(74) Attorney, Agent, or Firm—Young & Basile, P.C.

(57) ABSTRACT

A quick connector with a one-way flow valve includes a bearing cage mounted in a bore of a female component housing and supporting a tip end of a conduit lockingly held in the housing by a retainer. A projection extends from one end of the bearing cage and spaces a flow ball movably mounted in the housing bore at a first, flow permitting open position wherein flow paths between the male and female components are established around the exterior of the flow ball and between circumferentially spaced ribs formed in the housing and supporting the flow ball. The flow ball is automatically movable in response to a reverse direction acting fluid pressure differential to a second, flow-blocking position in sealing engagement with a valve seat formed in the housing bore to prevent reverse fluid flow through the connector.

4 Claims, 2 Drawing Sheets

# QUICK CONNECTOR WITH ONE-WAY CHECK VALVE

BACKGROUND

The present invention relates, in general, to quick connectors formed of male and female components and a retainer for releasably locking the male and female components together.

Quick connectors are widely employed in industrial applications to releasably and lockably interconnecting fluid conduits. Such connectors have proven reliable in many applications due to their low cost, easy assembly, and high pull-out forces resisting separation, etc.

Check valves have also been employed in quick connectors to block fluid flow when the male and female connector portions are disconnected. In such quick connectors, a check valve or ball is disposed within one bore of the connector and movable between two positions, one blocking fluid flow from one of the connector portions and another allowing fluid flow between the connector portions.

As shown in FIG. 1 and described in greater detail hereafter, check valves have been employed in quick connectors to block fluid flow from a conduit attached to one of the connector portions when the male and female connector portions are disconnected from each other. However, such a quick connector design relies on the mechanical insertion of the male component into the female component to move the check valve to the open position.

It would be desirable to provide a quick connector having a one-way flow or check valve integrally mounted therein which blocks flow in one direction through the joined connector portions while allowing flow in the opposite direction. It would also be desirable to provide a quick connector having a one-way check valve which is a robust design.

SUMMARY

The present invention is a quick connector having a one-way flow valve which blocks reverse fluid flow through the conduits connected to the quick connector.

In one aspect of the invention, the quick connector includes mating male and female components, a retainer locking the male and female components together. The female component has a through bore. A bearing cage is disposed in the through bore and receives a tip end of the male component. A projection extends from a first end of the bearing cage. A flow ball is mounted in the bore of the housing and is movable between a first flow permitting or open position wherein the flow ball engages the projection extending from the first end of the bearing cage and a second, flow blocking or closed position wherein the flow ball sealingly engages a valve seat formed in the bore in the housing. A plurality of support ribs are formed in the bore of the housing for supporting the rolling movement of the flow ball. The flow ball and the support ribs define flow paths around the flow ball and between the ribs, and into the bearing cage.

The quick connector of the present invention provides a one-way flow valve operation with a minimal number of components and without a spring which is subject to wear over long term use. The check valve uniquely blocks reverse fluid flow through the conduits connected to the quick connector, when the quick connector components are joined together.

BRIEF DESCRIPTION OF THE DRAWINGS

The various features, advantages and other uses of the present invention will become more apparent by referring to the following detailed description and drawing in which.

DETAILED DESCRIPTION

Before describing the inventive quick connector with one-way check valve, a prior art quick connector with check valve will be described in order to clarify the advantages of the present quick connector.

Figure 1:
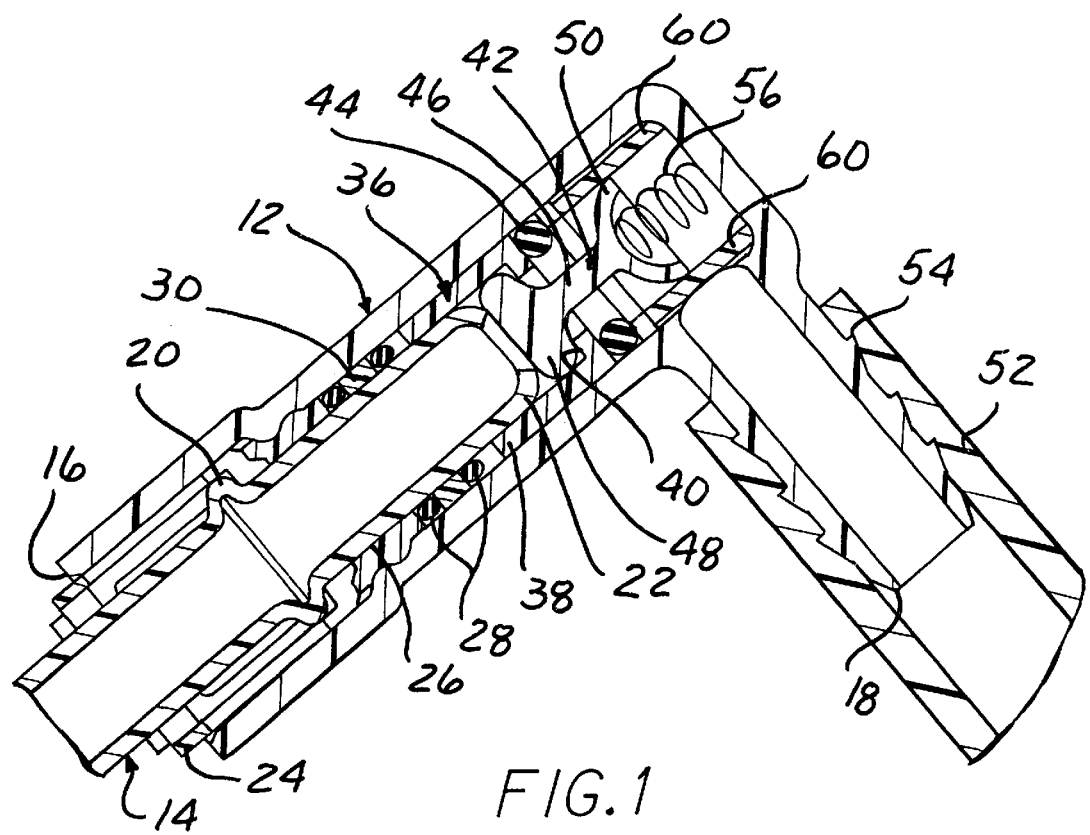
FIG. 1 is a longitudinal, cross-sectional view of a prior art quick connector having an internal check valve.

As shown in FIG. 1, the quick connector 10 is formed of a female component or housing 12 and a male component or conduit 14. The female component or housing is typically formed of metal or plastic and is illustrated by way of example only as having a 90° elbow shape. A stepped bore of varying diameters is formed in the housing 12 between a first end 16 and an opposed second end 18.

The male component 14 is typically in a form of a hollow conduit having an enlarged flange 20 spaced from a tip end 22. The flange 20 cooperates with a retainer 24 which is releasably locked in the housing 12 and holds the conduit 14 in a position against axial separation from the housing 12 as is conventional.

Further, a conventional rigid member or top hat 26, a pair of seal members, such as o-rings 28, and an intermediate spacer 30, are axially disposed in the bore in the housing 12 between the flange 20 and the tip end 22 of the tube 14 to provide a seal between the housing 12 and the male component or conduit 14.

A tubular sleeve 36 is mounted in the bore in the housing 12 at a position such that a first end 38 of the sleeve 36 forms a bearing surface for the tip end 22 of the conduit 14. A shoulder 40 is formed in the sleeve 36 intermediate the opposed ends of the sleeve 36 and acts as a stop for one end portion of a check valve 42. The sleeve 36 also has an annular recess adjacent one end for receiving a valve seal, such as an o-ring 44.

In the quick connector 10, the check valve 42 is in the form of a resilient member having a stem 46 which interconnects a generally planar first end 48 and an inverted hemispherical, cup-shaped second end 50. The first end 48 is limited in axial movement between one end portion of the sleeve 36 and the shoulder 40 in the sleeve 36. The planar first end 48 extends diametrically across the open end of the bore in the conduit 14 to allow fluid flow through the conduit 14 and the remainder of the through bore in the housing 12 toward the second end 18 of the housing 12 as shown in FIG. 1.

In this application, the check valve 42 is designed to block any fluid flow from a conduit 52 which is mounted over barbs 54 on the second end 18 of the housing 12. To do this, upon removal of a conduit 14 from the housing 12, a biasing spring 56 mounted in the bore in the housing 12 acts on the second end 50 of the check valve 42 to move the check valve 42 to a position in which the second end 50 is disposed in sealing engagement with the check valve seal 44 thereby blocking flow from the conduit 52 through the housing 12 and out of the first end of the housing 12.

As also shown in FIG. 1, a plurality of circumferentially spaced ribs 60, such as four ribs spaced 90° apart, are formed in the housing 12 and face radially inward into the bore in the housing 12. The peripheral edge of the second end 50 of the check valve 42 rides along the ribs 60 between the open and closed positions described above. Openings between adjacent ribs 60 and the exterior edge of the second end 50 of the check valve 42 establish flow openings for fluid flow past the second end 50 of the check valve 42 when the check valve 42 is in the open position shown in FIG. 1.

Reinsertion of the conduit 14 through the first end 16 of the housing 12 causes the check valve 42 to move against the biasing force of the spring 56 to the position shown in FIG. 1, thereby reestablishing flow between the conduit 14 and the conduit 52 around the exterior surface of the second end 50, the stem 46, and the first end 48 of the check valve 42.

Referring now to FIGS. 2–5, there is depicted a quick connector 70 of the present invention which incorporates a unique check valve for blocking fluid flow in one direction, opposite to the normal flow direction through the conduits attached to the quick connector 70, when the connector components are sealingly joined together.

Since the quick connector housing and retainer, as described hereafter, can take a number of forms, it will be understood that the following description of the quick connector 70 is by way of example only.

The quick connector 70 includes a female component 72 in the form of a housing 74 of irregular exterior shape. A stepped bore 76 extends through the housing 12 between a first end 78 and an opposed second end 79. One end portion of the stepped bore 76 receives one end of a male component 80 in the form of a hollow, tubular conduit having a tip end 82 and an enlarged, outwardly, radially extending, annular flange 84 spaced in proximity to the tip end 82. The opposite end, not shown, of the male component or conduit 80 is sealingly attached to a conduit. A pair of conventional seal members, such as o-rings 85, an intermediate spacer 86, and a rigid top hat 88 are mounted in the bore of the housing 72 between the tip end 82 and the enlarged flange 84 on the male conduit 80 to seal the male conduit 80 to the housing 72.

A retainer 90 is mountable through the open first end 78 of the housing 72 and includes elements which forcibly hold the flange 84 of the conduit 80 against axial separation from the housing 12. The retainer 90 shown in FIG. 1 is by way of example only and includes an annular collar 92 from which a pair of legs 94 angularly project. The outer ends of the legs 94 include recesses which snap into flanges formed at the first end 78 of the housing 72. Inward flexure of the outer ends 96 of the legs 94 separate radially inward extending fingers 98 on the legs 94 to move the fingers 98 radially outward a sufficient distance to clear the flange 84 on the conduit 80 thereby allowing the conduit 80 to be axially pulled through the first end 78 of the housing 72.

It will be understood that the retainer 90 described above and shown in FIG. 1 is depicted by way of example only. Other retainers, such as a retainer shown in U. S. Pat. Nos. 5,542,716, 5,730,481, 5,782,502, 5,863,077, and 5,951,063 may also be employed in the inventive quick connector 70.

The end portion 100 of the housing 72 adjacent the second end 78 is typically formed with a plurality of radially outwardly extending, angular barbs 102 which forcibly engage a flexible conduit, not shown, sealingly mounted thereover.

Figure 4:
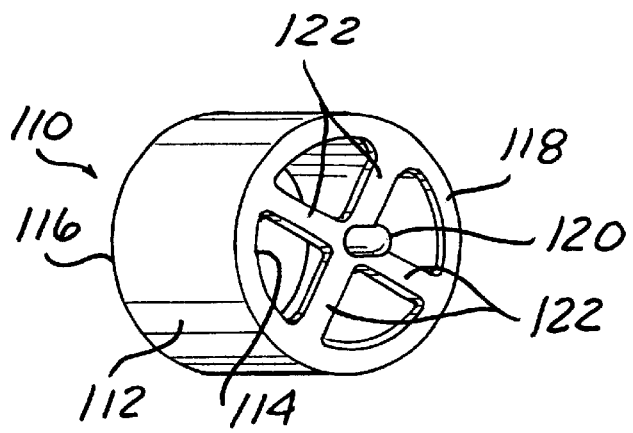
FIG. 4 is an enlarged, perspective view of the bearing cage shown in FIG. 3.

As shown in FIGS. 2–5, the stepped bore 76 in the housing 72 includes a bore portion denoted by reference number 104 of one diameter and an adjacent smaller diameter bore portion 106. The bore portion 104 is sized to receive a bearing cage 110. As shown in FIG. 4, the bearing cage 110 is in the form of a cylindrical sleeve having a sidewall 112 and a through bore 114 extending from a first end 116 to an opposed second end 118. A projection 120 extends generally axially from the second end 118 and is supported on the second end 118 by means of a plurality of radially extending arms 122 which are integrally formed with and extend radially inward from the sidewall 114. The projection 120 is integrally carried at the intersection of the arms 122.

The bearing cage 110 is held in a fixed position within the bore portion 104 by means of the top hat 88, o-rings 84, and spacer 86 which act on one end 116 of the bearing cage 110 and one end of support ribs 130. The bearing cage 110 forms a bearing surface for the tip end of the conduit 14.

When the bearing cage 110 is mounted in the bore portion 104 of the housing 72, the projection 120 extends into the adjacent bore portion 106, which bore portion 106 defines a check valve chamber for a check ball or flow ball 126. As described hereafter, the flow ball 126 is freely axially movable within the check valve chamber formed in the bore portion 106 between a first open position shown in FIG. 3, wherein the flow ball 126 contacts the outer end of the projection 120 on the bearing cage 110 spaced from apertures formed between the arms 122 in the end 118 of the bearing cage 110 and a second closed position shown in FIG. 2, in which the flow ball 126 sealingly engages a valve seat 128 formed at the juncture of one end of the bore portion 106 and a bore portion 110 extending through the end portion 100 of the housing 72.

Figure 2:
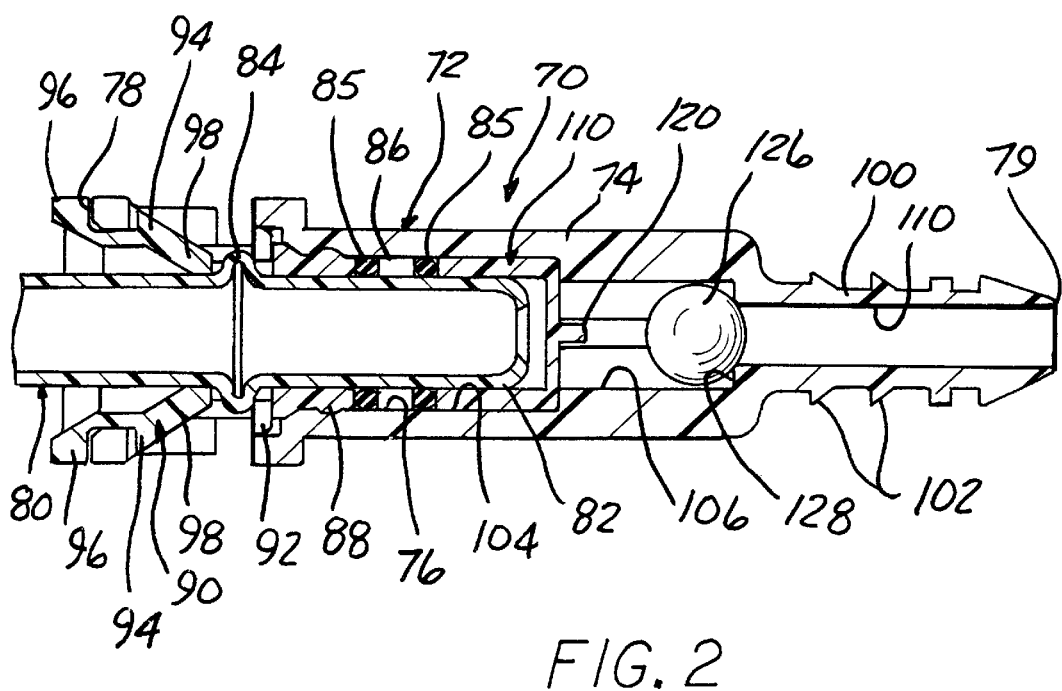
FIG. 2 is a longitudinal, cross-sectional view of a quick connector having a check valve constructed in accordance with the teachings of the present invention, with the check valve shown in the closed, flow-blocking position.
Figure 3:
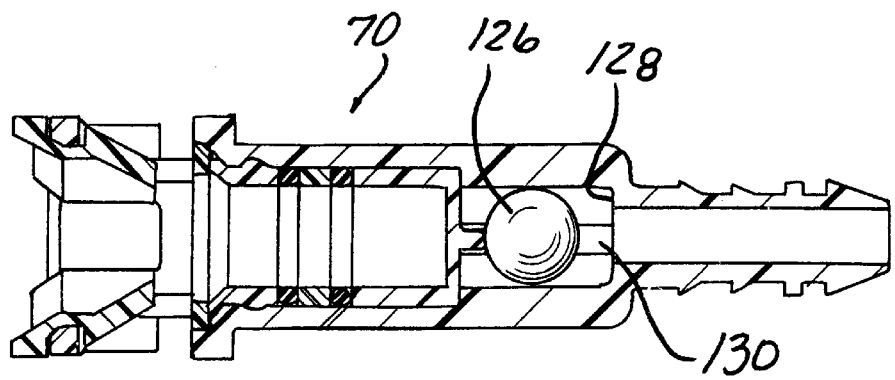
FIG. 3 is a perspective, longitudinally broken view of the quick connector and check valve of FIG. 2, with the check valve shown in the open, flow-permitting position.
Figure 5:
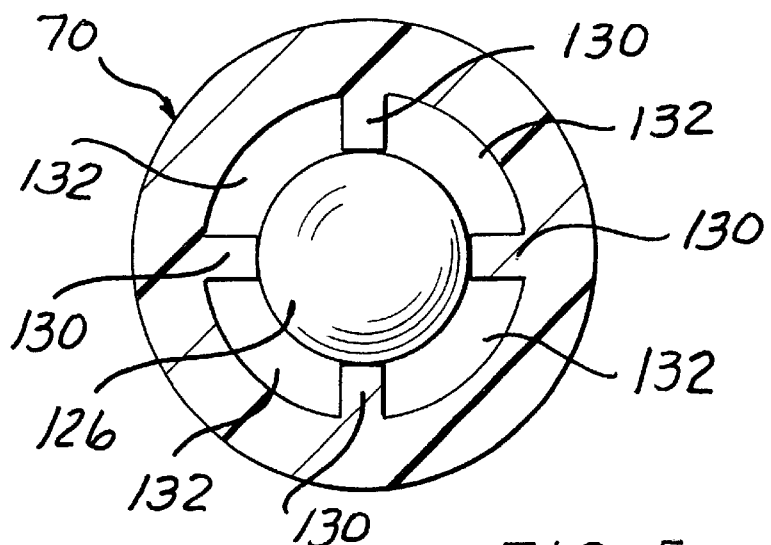
FIG. 5 is a partially broken, perspective view showing the support ribs in the connector housing.

The flow ball 126 is guided between the first and second positions by at least one end, preferably a plurality of circumferentially spaced, axially extending ribs 130, which are integrally formed in the housing 72 and disposed in a radially inward extending manner in the valve chamber or bore portion 106 as shown in FIGS. 2 and 5. The peripheral surface of the flow ball 126 rollably contacts the radially inner surface of the ribs 130 which are sized to allow only axial movement of the flow ball 126 between the first and second positions. However, the ribs 130 cooperate with the exterior surface of the flow ball 126 to form a plurality of circumferentially spaced flow apertures 132 between circumferentially adjacent surfaces of the ribs 130 and the exterior surface of the flow ball 126 as shown in FIG. 5. This enables fluid flow around the flow ball 126 when the flow ball 126 is in the first, open position shown in FIG. 3. In this position, the projection 120 on the bearing cage 110 spaces the flow ball 126 from the openings between the arms 122 on the first end 118 of the bearing cage 112, thereby allowing fluid flow through the bore portions 110 and 106, through the openings 132 formed between the ribs 130 and the ball 126 and the apertures between the arms 122 on the bearing cage 110, through the bore 114 in the bearing cage 110, and into and through the bore in the conduit 80.

In this orientation, by example, normal flow through the quick connector 70 is from the barbed end 110 of the housing 72 through the conduit 80. Any reverse flow which may occur due to pressure differentials acting on the fluid in the fluid flow system in which the quick connector 10 is mounted will drive the flow ball 126 from the open position shown in FIG. 3, to the closed position against the valve seat 126, thereby closing off fluid flow in a reverse direction from the conduit 80 through the barbed end 100 of the housing 72.

In summary, there has been disclosed a quick connector with a one-way flow valve which prevents reverse fluid flow through the conduits connected to the quick connector; while at the same time having a minimal number of components without any movable spring to implement check valve operation.

What is claimed is:

1. A quick connector for interconnecting first and second conduits in fluid flow communication, comprising:

mating male and female components, a retainer locking the male and female components together;

the female component having a through bore;

at least one seal member mounted in the through bore for fluidically sealing a tip end of the male component to the female component;

a projection extending from a first end of a bearing cage;

the bearing cage disposed in the through bore, a second end of the bearing cage receiving and supporting the tip end of the male component; and a flow ball movably mounted in the through bore of the female component and movable in response to fluid pressure differential thereacross between a first flow permitting, open position wherein the flow ball engages the projection extending from the first end of the bearing cage, and a second, flow blocking, closed position wherein the flow ball sealingly engages a valve seat formed in the bore in the female component.

2. The quick connector of claim 1 further comprising:

a plurality of support ribs formed in the bore for supporting movement of the flow ball, the flow ball and the plurality of support ribs defining flow paths between the ribs and around the flow ball and into the bearing cage.

3. The quick connector of claim 1 wherein the bearing cage comprises:

a cylindrical, hollow sleeve having a through bore extending between first and second ends; and support arms carried on the first end of the bearing cage and supporting the projection thereon.

4. The quick connector of claim 1 wherein:

the projection is axially aligned with a longitudinal axis through the bore in the bearing cage.

* * * * *